US012696231B2

(12) United States Patent
Ozozlu et al.

(10) Patent No.: US 12,696,231 B2
(45) Date of Patent: Jul. 28, 2026

---

(54) ANTICIPATED SATELLITE COVERAGE NOTIFICATIONS

(71) Applicant: T-MOBILE INNOVATIONS LLC, Overland Park, KS (US)

(72) Inventors: Akin Ozozlu, McLean, VA (US); Nagi A. Mansour, Arlington, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 359 days.

(21) Appl. No.: 18/198,702

(22) Filed: May 17, 2023

(65) Prior Publication Data

US 2024/0389064 A1 Nov. 21, 2024

(51) Int. Cl.
H04W 64/00 (2009.01)
G01S 19/05 (2010.01)
H04W 48/16 (2009.01)
G01S 19/13 (2010.01)

(52) U.S. Cl.
CPC ........... H04W 64/003 (2013.01); G01S 19/05 (2013.01); H04W 48/16 (2013.01); G01S 19/13 (2013.01)

(58) Field of Classification Search
CPC ....... H04W 4/029; H04W 64/00; H04W 4/02; H04W 84/06; H04W 4/021; H04W 4/023; H04W 4/90; H04W 24/10; H04W 4/027; H04W 64/003; H04W 4/025; H04W 4/024; H04W 36/322; H04W 12/63; H04W 48/04; H04W 72/542; H04W 48/14; H04W 52/0229; H04W 36/32; H04W 40/20; H04W 36/324; H04W 16/00; H04W 28/0226; H04W 36/247; H04W 72/543; H04W 36/249; H04W 52/241; G01S 19/42; G01S 19/05; G01S 19/258; G01S 19/48; G01S 5/0027; G01S 19/46; G01S 19/47; G01S 19/25; G01S 5/0036; G01S 19/20; G01S 5/0236; G01S 19/28; G01S 5/14; G01S 5/06; G01S 2013/932; G01S 19/51; G01S 5/011; G01S 19/00; G01S 19/10; G01S 1/00
See application file for complete search history.

(56) References Cited

U.S. PATENT DOCUMENTS

| | | | |
|---|---|---|---|
| 2022/0209874 A1* | 6/2022 | Svennebring | H04W 4/025 |
| 2023/0079636 A1* | 3/2023 | Edge | H04W 60/04 |
| | | | 370/316 |
| 2025/0016721 A1* | 1/2025 | Edge | H04W 64/00 |

* cited by examiner

*Primary Examiner* — Jing Gao
(74) *Attorney, Agent, or Firm* — SHOOK, HARDY & BACON L.L.P.

(57) ABSTRACT

Using a dataset of anticipated coverage areas associated with one or more satellites locally stored on a user equipment (UE) and a location of the UE, the UE can determine its location relative to a satellite coverage area. Various information can then be displayed by the UE, including an amount of time until the UE enters the satellite coverage area and how long it will be in the coverage area—allowing a user to plan calls and data sessions for times and durations that are more likely to be successful based on a connection with a satellite.

18 Claims, 8 Drawing Sheets

600

QUERY LOCALLY STORED DATA SET FOR ANTICIPATED COVERAGE AREA ~610

DETERMINE WITHIN THRESHOLD DISTANCE OF ANTICIPATED COVERAGE AREA ~620

DISPLAY SERVICE NOTIFICATION ~630

ANTICIPATED SATELLITE COVERAGE NOTIFICATIONS

SUMMARY

The present disclosure is directed to providing anticipate satellite coverage notifications to a user equipment (UE), substantially as shown and/or described in connection with at least one of the Figures, and as set forth more completely in the claims.

According to various aspects of the technology, a user equipment (UE) provides anticipated satellite coverage notifications on its graphic user interface. It is envisioned that satellite radio access networks (RANs) will be integrated with cellular telecommunication networks in the future. Particularly during early phases of satellite deployments, there will be locations where the UE will be beyond the reach of a terrestrial RAN; if a user needs to make a call or establish a data session, then it would be helpful for the user to know when the UE will be within a satellite coverage area. Accordingly, aspects of the present disclosure are directed to providing indication on a UE based on determinations about the UE's proximity to one or more satellite coverage areas, allowing users to better plan the timing and duration of calls and data sessions.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
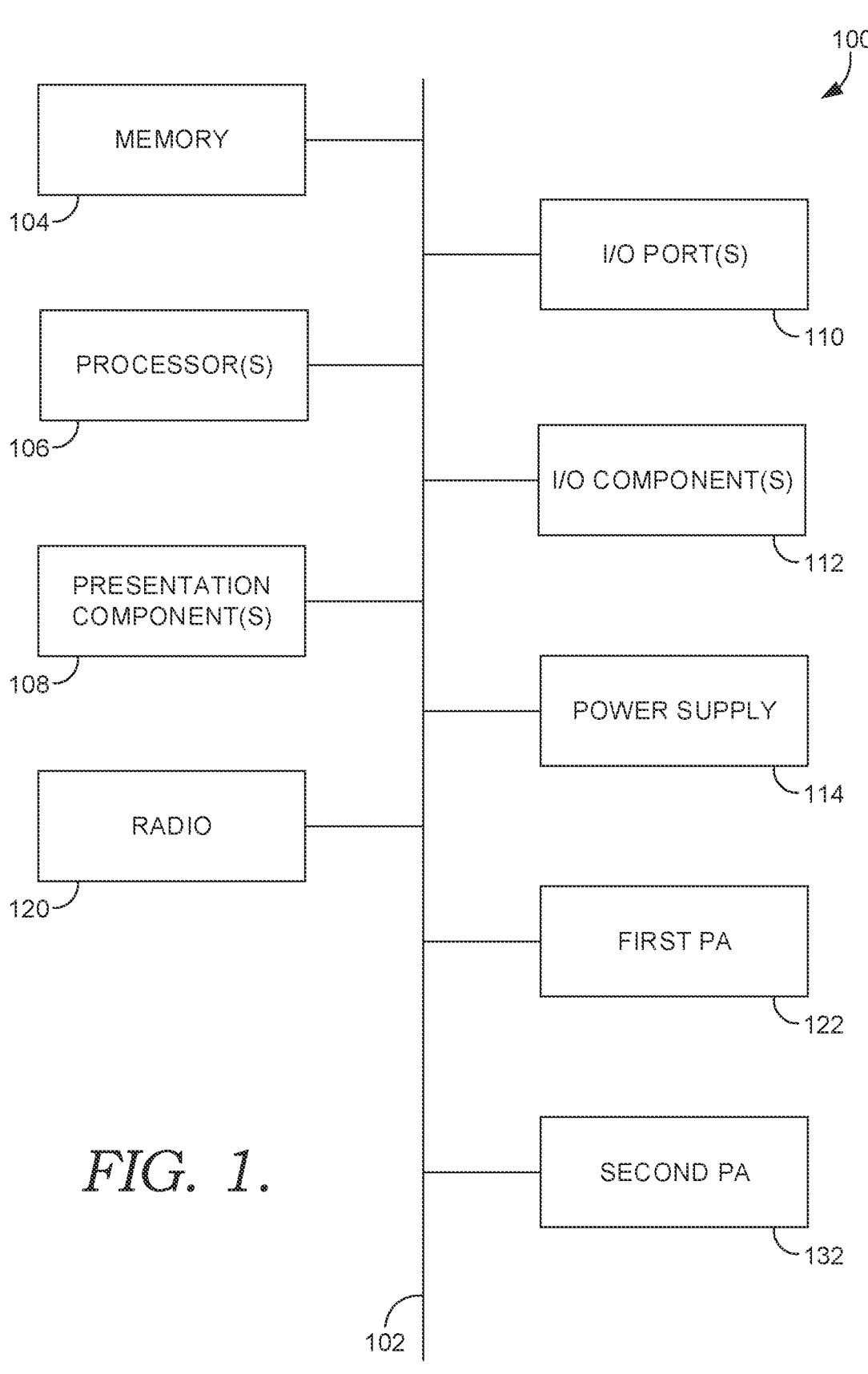
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like. The term "node" is used to refer to an access point that transmits signals to a UE and receives signals from the UE in order to allow the UE to connect to a broader data or cellular network (including by way of one or more intermediary networks, gateways, or the like)

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, the provision of telecommunication services is moving beyond the surface of the earth at increasing speed. Network operators, once exclusively operating terrestrial base stations, will begin to utilize satellite communication systems to provide coverage to areas unserved by terrestrial base stations. Because of space launching restrictions on size/weight, the expense of manufacturing a satellite, regulatory pressure, or any other reason, it is likely that the number of satellites used for integration into a cellular telecommunication network will be limited. Therefore, even when a UE is beyond the range of a terrestrial radio access network (RAN), it is unlikely to enjoy persistent satellite coverage. Attempting to make calls or otherwise access a data or communications network when no service exists is frustrating to subscribers and can cause safety of life issues in an emergency situation. Conventionally, and prior to the integration of satellite RANs with terrestrial RANs, a subscriber's only options were to seek higher ground or a clearer line of sight to a base station, or to move towards a known/suspected coverage area.

In contrast to conventional solutions and to facilitate a more optimized use of satellite-integrated cellular telecommunication systems, the present disclosure is directed to systems and methods for providing anticipate satellite coverage notifications to a UE. By querying a locally stored dataset, a UE can determine its proximity to a satellite coverage area, predict the onset of satellite coverage, predict a coverage window, and predict an inter-service duration. By displaying a notification to a subscriber using the UE, the subscriber can make more informed decisions about using the UE. Depending on the particularities of satellite deployment and use of the UE, some aspects of the present disclosure include providing instructional information that can assist a user in positioning the UE to improve a wireless connection between the UE and the satellite.

Accordingly, a first aspect of the present disclosure is directed to a user equipment (UE) configured to provide an anticipated satellite coverage notification. The UE comprises a graphic user interface, one or more antennas configured to wirelessly communicate with a satellite radio access network; and one or more computer processing components. The one or more computer processing components are configured to determine a location of the UE. The one or more computer processing components are further configured to query a dataset stored locally on the UE comprising an anticipated coverage area associated with a first satellite. The one or more computer processing components are further configured to determine the location of the UE is within a predetermined threshold distance of the anticipated coverage area associated with the first satellite. The one or more computer processing components are further configured to display, on the graphic user interface, a satellite coverage indication.

A second aspect of the present disclosure is directed to a method fo providing anticipated satellite coverage information comprising. The method comprises determining a location of a user equipment (UE). The method further comprises querying a dataset stored locally on the UE comprising a first coverage area associated with a first satellite and a second coverage area associated with a second satellite. The method further comprises determining the location of the UE is within a predetermined threshold distance of the first coverage area. The method further comprises displaying a first indication on a graphic user interface of the UE, the first indication comprising a first amount of time until the UE is within the first satellite coverage area.

Another aspect of the present disclosure is directed to a non-transitory computer readable media having instructions stored thereon that, when executed by one or more computer processing components, cause the one or more computer processing components to perform a method for delivering anticipated satellite coverage indications. The method comprises querying a locally stored dataset comprising an anticipated coverage area of a satellite. The method further comprises determining a location of a user equipment (UE). The method further comprises determining the location of the UE is within a predetermined threshold distance of the anticipated coverage area. The method further comprises displaying, on a graphic user interface of the UE, an indication of a first amount time until the UE is within the anticipated coverage area, a second amount of time that the UE will be within the anticipated coverage area, and UE orientation information indicating an elevation an azimuth for maintaining an unobstructed view to the satellite.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device, The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 140 represent radios that facilitate communication with one or more wireless networks using one or more wireless links. In aspects, the first radio 120 utilizes a first transmitter 122 to communicate with a wireless network on a first wireless link and the second radio 140 utilizes the second transmitter 132 to communicate on a second wireless link. Though two radios are shown, it is expressly conceived that a computing device with a single radio (i.e., the first radio 120 or the second radio 140) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 140 may carry wireless communication functions or operations using any number of desirable wireless communication protocols, including 802.11 (Wi-Fi), WiMAX, LTE, 3G, 4G, LTE, 5G, NR, VOLTE, or other VoIP communications. In aspects, the first radio 120 and the second radio 140 may be configured to communicate using the same protocol but in other aspects they may be configured to communicate using different protocols. In some embodiments, including those that both radios or both wireless links are configured for communicating using the same protocol, the first radio 120 and the second radio 140 may be configured to communicate on distinct frequencies or frequency bands (e.g., as part of a carrier aggregation scheme). As can be appreciated, in various embodiments, each of the first radio 120 and the second radio 140 can be configured to support multiple technologies and/or multiple frequencies; for example, the first radio 120 may be configured to communicate with a base station according to a cellular communication protocol (e.g., 4G, 5G, 6G, or the like), and the second radio 140 may configured to communicate with one or more other computing devices according to a local area communication protocol (e.g., IEEE 802.11 series, Bluetooth, NFC, z-wave, or the like).

Figure 2:
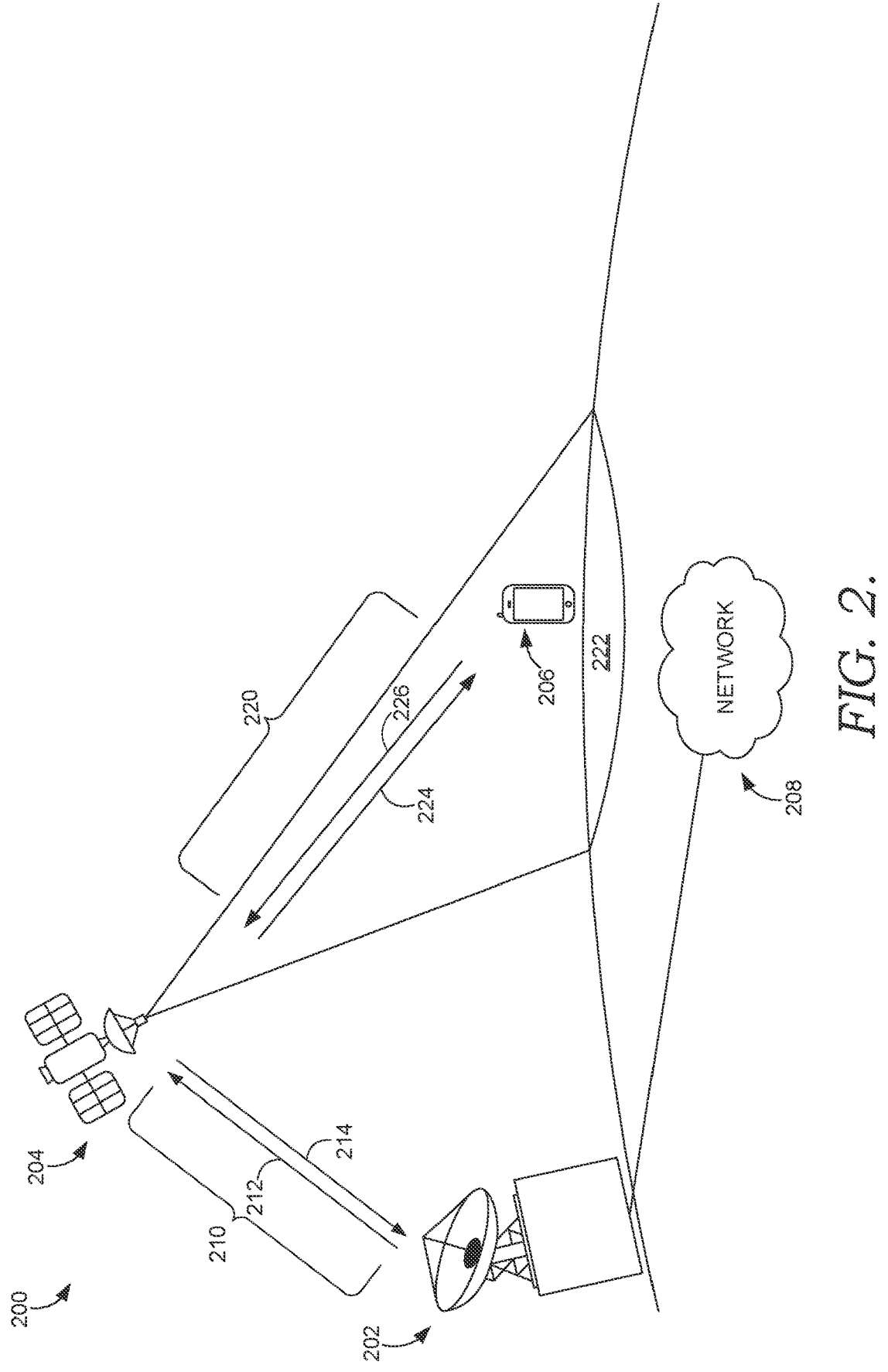
FIG. 2 illustrates an exemplary network environment in which implementations of the present disclosure may be employed.

Turning now to FIG. 2, an exemplary network environment is illustrated in which implementations of the present disclosure may be employed. Such a network environment is illustrated and designated generally as network environment 200. At a high level the network environment 200 comprises a gateway 202, a satellite 204 of a satellite radio access network (RAN), a UE 206, and a network 208. Though the composition of network environment 200 illustrates objects in the singular, it should be understood that more than one of each component is expressly conceived as being within the bounds of the present disclosure; for example, the network environment 200 may comprise multiple gateways, multiple distinct networks, multiple UEs, multiple satellites that communicate with a single gateway, and the like. Similarly, though certain objects of network environment 200 are illustrated in a certain form, it should be understood that they may take other forms; for example, even though the UE 206 is illustrated as a cellular phone, a UE suitable for implementations with the present disclosure may be any computing device having any one or more aspects described with respect to FIG. 1

The network environment 200 includes a gateway 202 communicatively connected to the network 208 and the satellite 204. The gateway 202 may be connected to the network 208 via one or more wireless or wired connections and is connected to the satellite 204 via a feeder link 210. The gateway 202 may take the form of a device or a system of components configured to communicate with the UE 206 via the satellite 204 and to provide an interface between the network 208 and the satellite 204. Generally, the gateway 202 utilizes one or more antennas to transmit signals to the satellite 204 via a forward uplink 212 and to receive signals from the satellite 204 via a return downlink 214. The gateway 202 may communicate with a plurality of satellites, including the satellite 204. The network 208 comprises any one or more public or private networks, any one or more of which may be configured as a satellite network, a publicly switched telephony network (PSTN), or a cellular telecommunications network. In aspects, the network 208 may comprise a satellite network connecting a plurality of gateways (including the gateway 202) to other networks, a cellular core network (e.g., a 4G, 5G, of 6G core network, an IMS network, and the like), and a data network. In such aspects, each of the satellite network and the cellular core network may be associated with a network identifier such as a public land mobile network (PLMN), a mobile country code, a mobile network code, or the like, wherein the network identifier associated with the satellite network is the same or different than the network identifier associated with the cellular network.

The network environment 200 includes one or more satellites, represented by satellite 204. The satellite 204 is generally configured to relay communications between the gateway 202 and the UE 206. The satellite 204 communicates with the gateway using the feeder link 210 and communicates with the UE 206 using a user link 220. The user link 220 comprises a forward downlink 224 used to communicate signals from the satellite 204 to the UE 206 and a return uplink 226 used to communicate signals from the UE 206 to the satellite 204. The satellite 204 may communicate with the UE 206 using any wireless telecommunication protocol desired by a network operator, including but not limited to 3G, 4G, 5G, 6G, 802.11x and the like. Though shown as having a single beam providing coverage to a satellite coverage area 222, the satellite 204 may be configured to utilize a plurality of individual beams to communicate with multiple different areas at or near the same time. Similarly, though a single forward downlink 224 and a single return uplink 226 are illustrated, the UE 206 may utilize multiple downlinks and/or multiple uplinks to communicate with the satellite 204, using any one or more frequencies as desired by a satellite or network operator.

Generally, the satellite 204 is characterized by its orbit around the earth. The orbit of any particular satellite will vary by operator desire and/or intended use; for example, a satellite suitable for use with the present disclosure may be characterized by its maximum orbital altitude and/or orbital period as Low Earth Orbit (LEO), Medium Earth Orbit (MEO), and High Earth Orbit (HEO)—also referred to herein as characterizing an orbital plane. Though not rigidly defined, an LEO satellite may orbit with a maximum orbital altitude of less than approximately 1,250 miles, an MEO satellite may orbit with a maximum orbital altitude generally between 1,250 and 22,000 miles, and an HEO satellite may orbit with a maximum orbital altitude of greater than approximately 22,000 miles. In some, but not all cases, a satellite in HEO may be considered geosynchronous (i.e., geosynchronous earth orbit (GEO)) on the basis that its orbital period is approximately equal to the length of a sidereal or solar day (approximately 24 hours); generally, a satellite in geosynchronous orbit will appear to be in the same position relative to a fixed point on the surface of the earth 208 at the same time each day. A geostationary orbit is a special type of geosynchronous orbit with the Earth's equator with each of an eccentricity and inclination equal to zero. Some satellites in HEO and all that are in LEO or MEO have an orbital period that is different than the length of a sidereal/solar day and are considered to be non-geosynchronous and do not remain stationary relative to a fixed position on the surface of the Earth. As used herein, a satellite in LEO has a lower orbital plane than a satellite in MEO or HEO, an MEO satellite has a higher orbital plane than a satellite in LEO, and an HEO satellite has a higher orbital plane than a satellite in LEO or MEO.

Figure 3A:
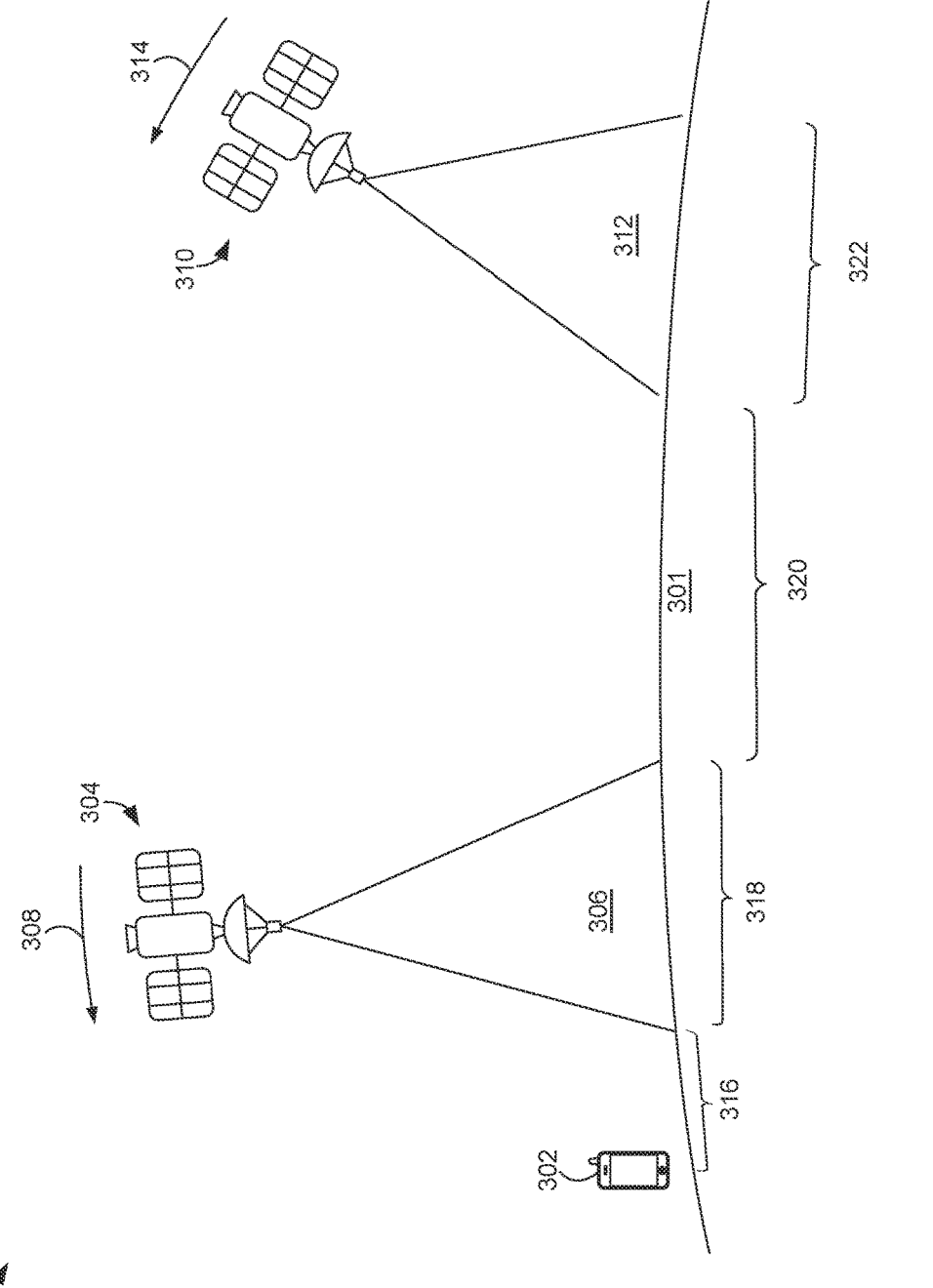
FIGS. 3A-3C illustrates a diagram of an exemplary environment in which implementations of the present disclosure may be employed.
Figure 3B:
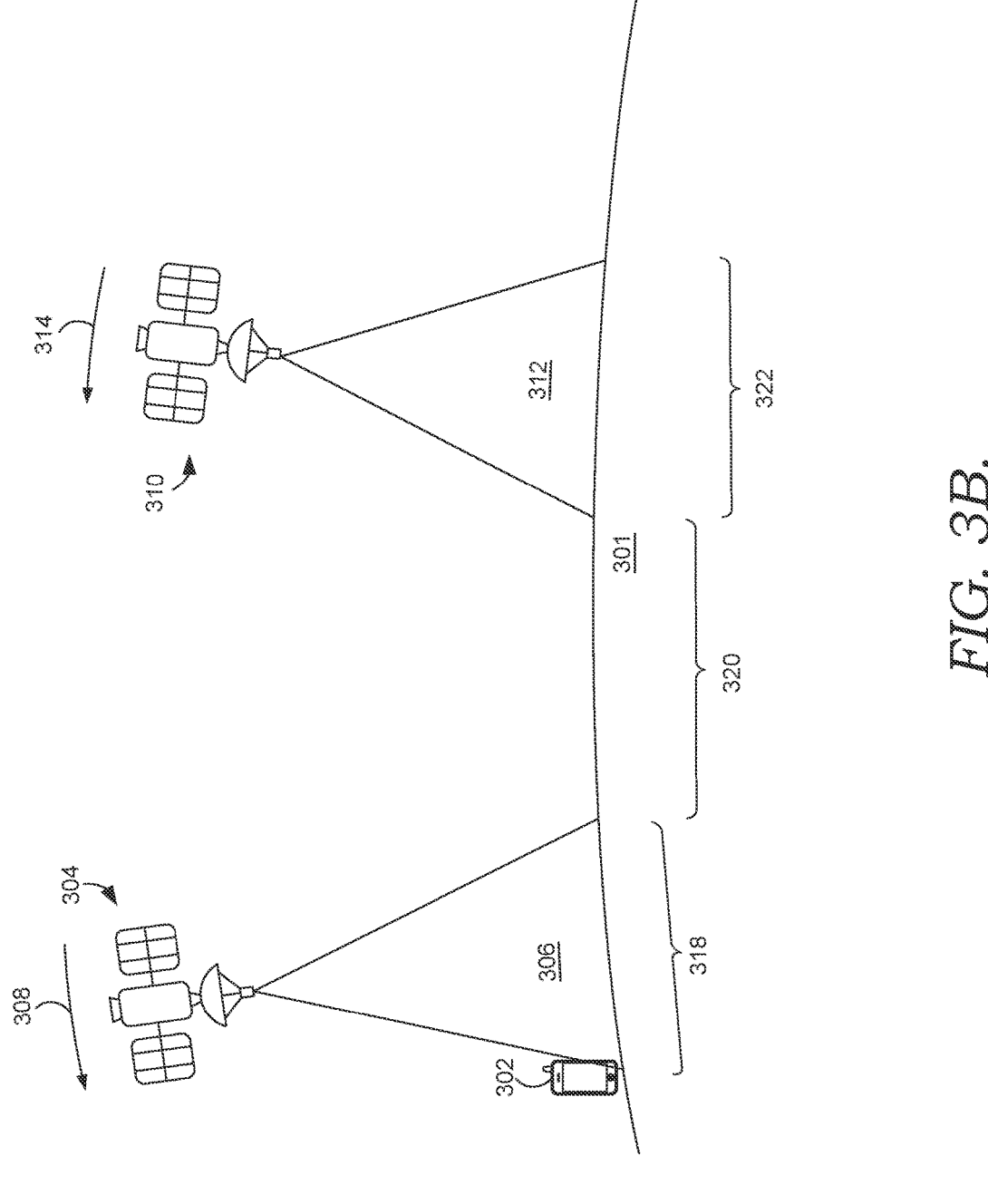
Figure 3C:
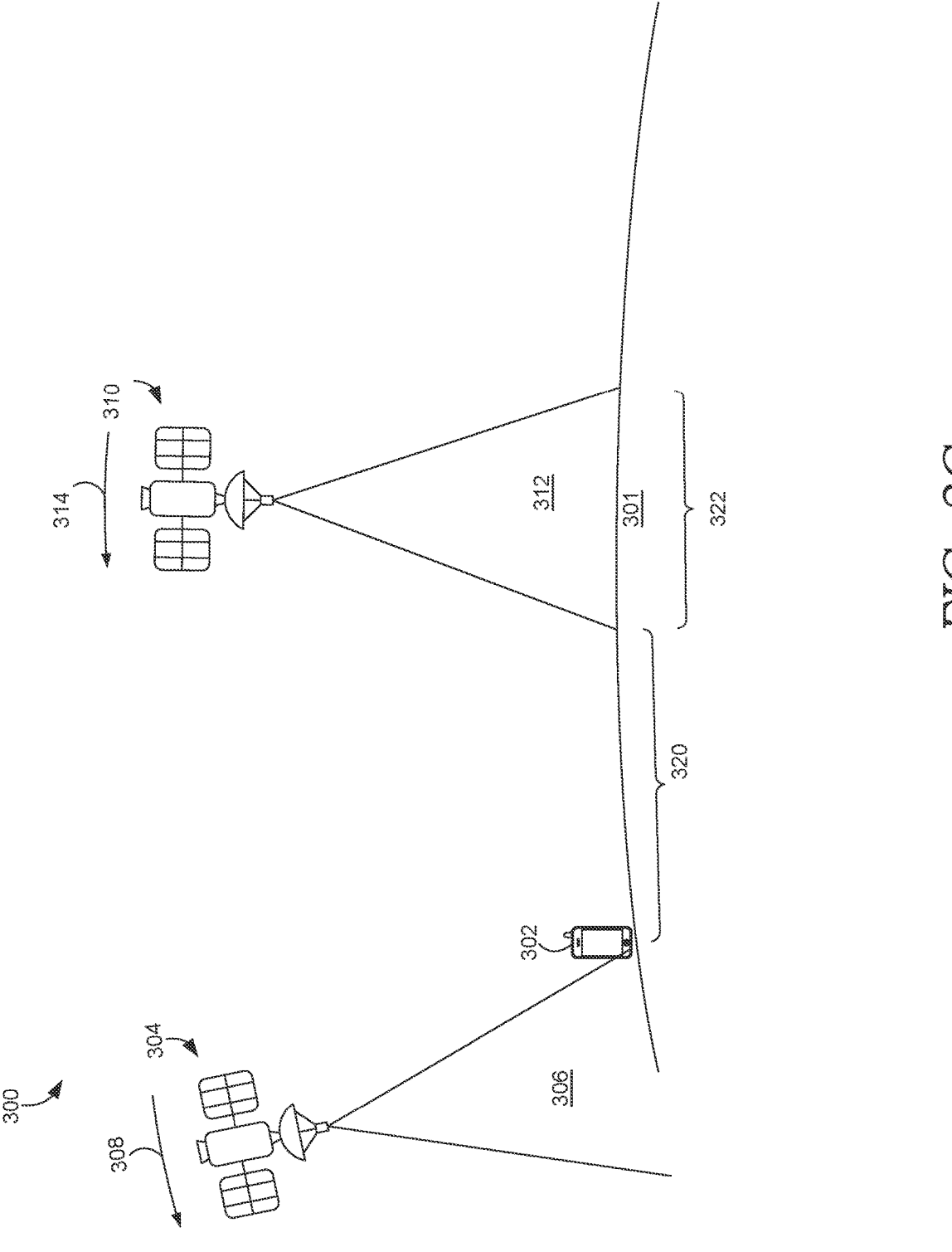

Turning now to FIG. 3A-3C, an exemplary network environment is illustrated in which implementations of the present disclosure may be employed. Such a network environment is illustrated and designated generally as network environment 300. The network environment 300 generally comprises one or more satellites, such as a first satellite 304 and a second satellite 310 and a UE 302 at or near a surface of the earth 301. The network environment 300 includes one or more components or functions of the network environment 200 of FIG. 2; for example, each of the first satellite 304 and the second satellite 310 of the network environment 300 have any one or more aspects of the satellite 204, and the UE 302 of the network environment 300 have any one or more aspects of the UE 206 of network environment 200 in FIG. 2. Further, the UE 302 is configured with one or more location services, when utilized by the UE 302, allow the UE 302 to determine timing and its location on the earth 301; such location services may relevantly include one or more satellite location services (e.g., global positioning system (GPS)).

Turning to FIG. 3A, and in contrast to conventional technology wherein the UE 302 may simply indicate on a graphic user interface that it does not have service when outside of a coverage area, the present disclosure provides notifications or indications to a user via a graphic user interface that provide information about anticipated satellite coverage.

With continued reference to FIG. 3A, the UE 302 is configured to provide an indication of when satellite coverage will be available. Initially, using the location services of the UE 302, the UE 302 first determines its location on the earth 301. The UE 302 then performs a query of a locally-stored dataset to determine one or more upcoming satellite coverage areas. Because the first satellite 304 moves along a first track 308 and the second satellite 310 moves along a second track 314, the UE 302 will be inside each of a first satellite coverage area 306 of the first satellite 304 and the second satellite coverage area 312 of the second satellite 310 at some point in the future—even if the UE 302 is not moving.

In order to predict its distance to one or more satellite coverage areas, the UE may query a locally stored record (i.e., dataset), wherein the locally stored record is populated by either constellation information obtained from an external source and/or or created based on the UE's own observations.

A UE may determine its proximity to a satellite coverage area based on information the UE receives from an external source. Such external source data may comprise actual coverage area, corresponding to times and locations where the UE can expect coverage or may comprise at least partial constellation information relating to a constellation of satellites designed to provide wireless telecommunication services to the UE. External data relating to expected coverage area(s) may take any desirable form but would generally be usable to provide the UE with an indication that coverage can be expected in a particular time at a particular location (or within a particular range of a particular location). The UE may be provided with an indication that coverage is to be expected in an area (e.g., a circular, ovular, or hexagonal area) at least partially defined by a radius (e.g., 100 miles) of a center point that at least approximately represents the center point of the geographic coverage area on a particular date and time. For example, external coverage data may indicate that a circular area of coverage will be centered at a geographic location of 51°22'25"N 72°06'05"W and will have a radius of 100 miles at a particular time on a particular day. The UE can utilize the data to determine that is within the 100 mile radius of the geographic center point at that particular on that particular time. In some aspects, the external source data may take form of a lookup table comprising dates/times, a center point, and a radius of coverage. In other aspects, the external source data may comprise extraterrestrial constellation information.

Figure 5:
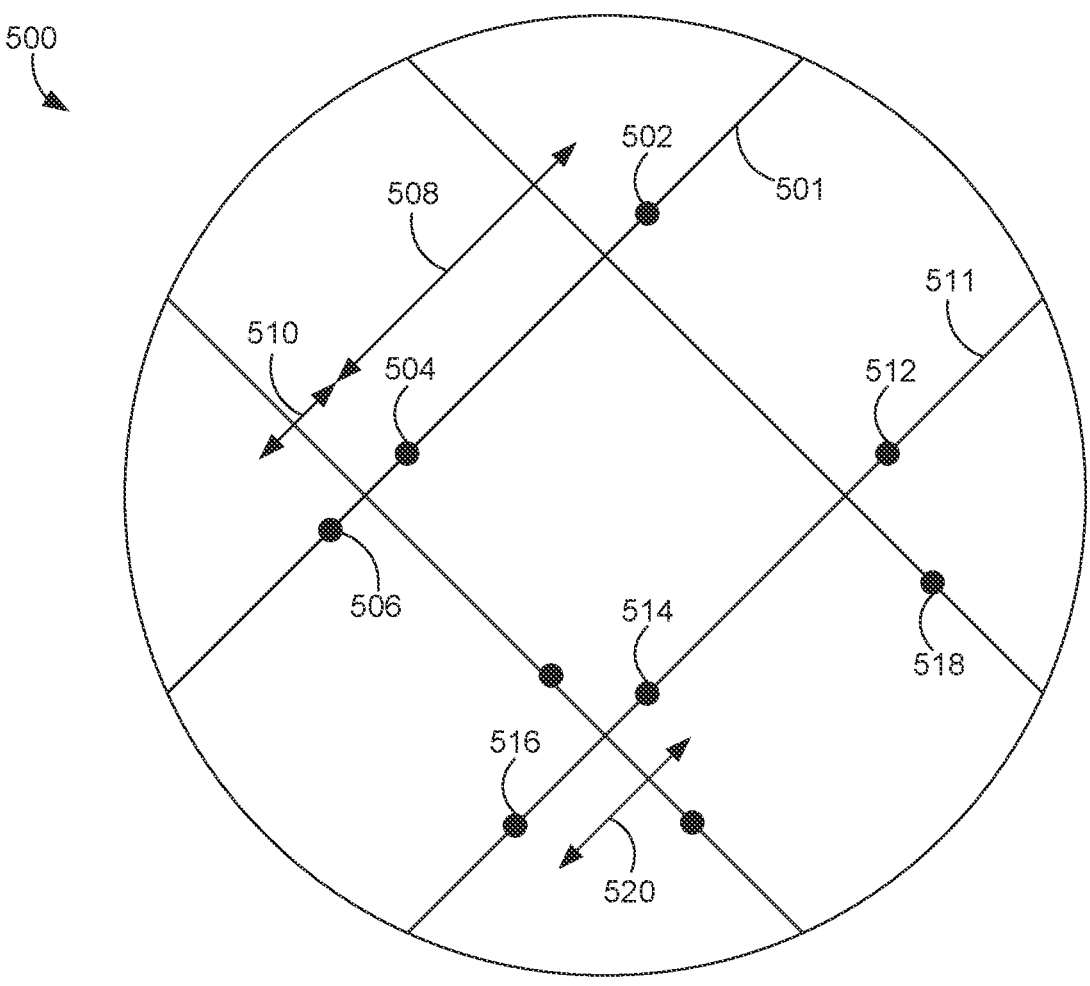
FIG. 5 illustrates a model of a satellite constellation, for use with one or more aspects of the present disclosure.

Turning now to FIG. 5, external source data comprising extraterrestrial constellation information is illustrated. Said constellation information at least partially represents a satellite constellation 500. The constellation data may comprise indications that the satellite constellation includes one or more satellites; for example, the external constellation data may comprise a first satellite 502 which may represent the first satellite 304 of FIGS. 3A-3C, a second satellite 504 which may represent the second satellite 310 of FIGS. 3A-3C, a third satellite 506, a fourth satellite 512, a fifth satellite 514, and a sixth satellite 514. The constellation data may include indications that each of the first satellite 502, the second satellite 504, and the third satellite 506 travel along a first orbital path 501. The first satellite 502 may be separated from the second satellite 504 by a first distance 508 and the second satellite 504 may be separated from the third satellite 506 by a second distance 510, wherein the first distance 508 may be equal to or different than the second distance 510. Similarly, constellation data may comprise include information that each of the fourth satellite 512, the fifth satellite 514, and the sixth satellite 516 travel along a second orbital path 511. The fourth satellite 512 may be separated from the second satellite 514 by a third distance 518 and the fifth satellite 514 may be separated from the sixth satellite 516 by a fourth distance 520, wherein the third distance 518 may be equal to or different than the fourth distance 520, the first distance 508, and the second distance 510. Based on the external constellation data comprising the time, location, and track of one or more satellites, the UE 302 of FIGS. 3A-3C can model, calculate, or otherwise determine, in combination with a determination of its current position on the surface of the earth (e.g., by way of the UE's native GPS sensor(s)), when service is expected at said current position.

Returning now to FIGS. 3A-3C, External source expected coverage data may be localized (e.g., focused on a relatively small radius in the vicinity of a remote campsite) or may be provided for a predetermined range (e.g., 10, 50, or 100 miles) beyond a persistent coverage area, wherein the persistent coverage area is defined as an area where UEs are expected to have persistent coverage with one or more radio access networks (e.g., based on a greater than threshold likelihood of successfully camping on a base station). In aspects, the persistent coverage area may be only based on service from a particular type of radio access network, such as terrestrial base stations or from radio access nodes of a particular carrier/operator (e.g., having a common carrier identifier such as a public land mobile network number, access point name, or the like).

External source expected coverage data may be manually obtained based on a user input or automatically obtained based on UE activity. The UE 302 may receive an input from a user that requests the external source expected coverage data (e.g., if a user knows or suspects they will be (or are likely to be) beyond a persistent coverage area. For example, a user may be heading to a remote campsite where they do not expect constant telecommunication coverage (whether from terrestrial base stations, satellites, or both); accordingly, the UE 302 may receive a manual indication from the user that can be used to obtain the external source expected coverage data for a particular location or area. That external source expected coverage data can then be utilized by the UE 302 at a later time to perform the operations described herein with respect to determining anticipated satellite coverage areas and providing a notification or indication to the user about the timing of entry/exit into said satellite coverage areas.

External source expected coverage data may additionally or alternatively be obtained automatically based on UE activity. In such an aspect, the UE 302 may obtain the external source expected coverage data based on a determination that the UE 302 is, or is likely, to depart the persistent coverage area. For example, the first UE 302 or a network operator may determine that the first UE 302 is scheduled to depart a persistent coverage area based on travel itinerary information for a user associated with the first UE 302 (e.g., airplane tickets, hotel/campsite reservations, charter boat booking, etc.), based on a pattern of behavior (e.g., the UE 302 departs a persistent coverage area every weekend), and/or based on movement of the UE 302 towards the edge of a persistent coverage area (e.g., a sequence of handovers indicates the UE 302 is advancing towards the edge of a persistent coverage area). Regardless of the particular basis, upon a determination that the UE 302 is forecasted to depart the persistent coverage area, external source expected coverage data may be pushed to or otherwise downloaded by the UE 302 prior to departure from the persistent coverage area.

Figure 4:
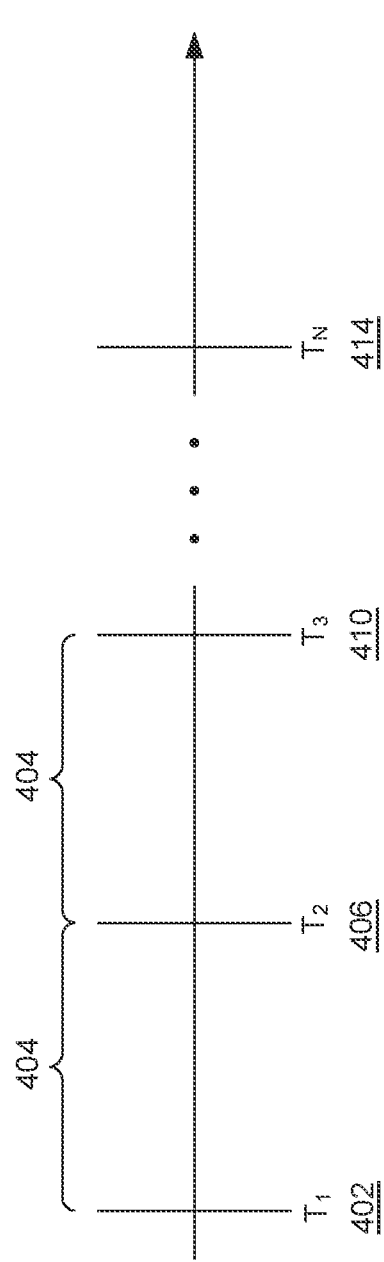
FIG. 4 illustrates a timing diagram used to observe and estimate extraterrestrial coverage, according to one or more aspects described herein.
Figure 4:

The UE 302 may determine if it is in or sufficiently near a geographic service area based on a query of a local record populated by the UE 302's own observations. Referring to a timeline 400 of FIG. 4, the UE 302 of FIGS. 3A-3C may detect a set of synchronization signals from the first satellite 304 (e.g., using a cell identifier) at a particular location at a first time 402 and a subsequent second time 406. Accordingly, the UE 302 of FIG. 3A-3C may determine that the first satellite 304 provides coverage for the particular location at an interval equal to an amount of time 404. At a third time 410 equal to the amount of time 404 after the second time 406, the UE 302 of FIGS. 3A-3C may display one or more anticipated coverage notifications or indications based on determinations about the UE 302's proximity to its location at the first time 402 and the second time 406. For example, referring to FIG. 3B, the UE 302 may determine that it is within the first satellite service area 306 of the first satellite 304 at 11:00 pm Greenwich Mean Time (GMT) on a Friday at a position on the surface of the Earth 301 determined by a GPS sensor of the UE 302 to be 38.9346 degrees north, 94.6413 degrees west. Based on a determination by the UE 302 that it is at the same position at 11:00 pm GMT on Saturday, the UE 302 may determine that the first satellite 304 has an orbital period of 24 hours at that particular location. Utilizing this observed orbital data, the UE 302 may determine its proximity to anticipated satellite coverage area(s) based on the UE being within a predetermined distance of the same position at 11:00 pm GMT on a subsequent day. Though the preceding example utilizes an orbital time of 24 hours, a person having skill in the art would understand that any orbit could be suitable within the disclosed framework.

Returning to FIG. 3A, the UE 302 may generate and display one or more notifications or indications about anticipated satellite coverage for the UE 302. Based on the UE 302's query of its locally stored dataset, the UE 302 may determine that it is not within a satellite coverage area at a first time (illustrated by FIG. 3A), but that it is a first distance 316 from an anticipated entry into the first satellite coverage area 306 and that a second distance 318 equates to a first satellite coverage window for the first satellite coverage area 306. In aspects, the UE 302 may additionally determine an inter-coverage distance 320 and a second satellite coverage window 322. Each of said distances may be converted by the UE 302 into a timing estimate, wherein the UE 302 determines a first amount of time until the UE 302 enters into the first satellite coverage area 306, a second amount of time that the UE 302 will be within the first satellite coverage area 306, a third amount of time that the UE 302 will be outside of satellite coverage (between the first satellite coverage area 306 and the second satellite coverage area 310), and a fourth amount of time that the UE 302 will be within the second satellite coverage area. In aspects, initiating the process to perform said timing determinations may be based on a manual input received from a user; in other aspects, said determinations may be performed based on a determination by the UE 302 that that the UE 302 has been without any service (and/or without satellite service) for greater than a predetermined threshold amount of time. Although shown as approximately equal, it is likely that the second amount of time and the fourth amount of time will be different-particularly when interacting with a low-density constellation.

The delivery means and content of the one or more notifications or indications may be at the discretion of a handset manufacturer or mobile network operator. In aspects, the one or more notifications or indications may be displayed on a graphic user interface of the UE 302 as a push notification (not requiring any particular application to be active/open). The one or more notifications or indications may be displayed on the graphic user interface at a predetermined threshold time in advance of the UE 302 entering the first satellite coverage area 306, and may include a countdown until the UE 302 enters the first satellite coverage area 306. The one or more notifications or indications may comprise an audible or visual alert in addition to a notification, wherein a user-perceptible sound (e.g., a chirp or beep) may be played or a user-perceptible visual (e.g., a flashing or strobe effect of an LED/flashlight/screen of the UE 302) when the first distance 316 (or the equivalent time) is less than a predetermined threshold. In addition to or in the alternative to a push notification, the UE 302 may provide an indication in an application running on the UE 302, wherein an indication about the first amount of time, the second amount of time, the third amount of time, and/or the fourth amount of time is displayed in response to a query or input from a user requesting anticipated satellite coverage information.

In addition to providing timing information about anticipated satellite coverage, aspects of the present disclosure further generate and display orientation information on the graphic user interface of the UE 302. In aspects, the UE 302 may comprise an antenna, whether internal or external, that permits a user to orient the UE 302 in ways that would improve the connection quality between the UE 302 and a satellite (e.g., the first satellite 304 or the second satellite 310). In other aspects, the locally stored dataset may comprise an indication about whether a particular satellite is vertically polarized, horizontally polarized, or circularly polarized. Accordingly, the one or more notifications or indications may comprise an indication that the UE 302 (or an external antenna coupled thereto) should be oriented in particular fashion. Said orientation information may suggest that the UE 302 be held vertically, horizontally, or at a 45 degree angle based on the polarization of the satellite and the polarization of the UE 302, may suggest an elevation and azimuth for pointing an external antenna, or may suggest an elevation and azimuth for providing the UE 302 an unobstructed view of the sky.

Turning now to FIG. 3B, UE 302 may generate and display one or more notifications or indications about observed satellite coverage for the UE 302. Whether in response to a determination that the UE 302 has entered the first satellite coverage area 306 based on the query of the locally stored dataset or an observation of a set of synchronization signals from the first satellite 304 having one or more key performance indicators (KPIs) (e.g., a reference signal receive power) greater than a predetermined threshold value, the one or more notifications or indications may comprise an indication that the UE 302 has entered the first satellite coverage area 306. Said one or more notifications or indications may comprise any one or more of orientation information described with respect to FIG. 3A, an anticipated coverage window equal to the second amount of time that the UE 302 is predicted to be within the first satellite coverage area 306, and subsequent coverage information (e.g., the third amount of time until the UE 302 is anticipated to be within the second satellite coverage area 312 and the fourth amount of time that the UE 302 is predicted to be within the second satellite coverage area 312).

Turning now to FIG. 3C, the UE 302 may generate and display one or more notifications or indications about exiting the first satellite coverage area 306. Whether in response to a determination the UE 302 has exited the first satellite coverage area 306 based on the query of the locally stored dataset or an observation that the set of synchronization signals from the first satellite 304 are below a predetermined threshold (or that the UE 302 has wholly stopped observing the synchronization signals), the one or more notification or indications may comprise an indication the UE 302 has exited the first satellite coverage area 306. Said one or more notifications or indications may comprise subsequent coverage information such as the third amount time until the UE 302 enters the second satellite coverage area 312, the fourth amount of time that the UE 302 is predicted to be within the second satellite coverage area 312, and orientation information.

In one illustrative but non-limiting example of the anticipated coverage notification scheme disclosed herein and with reference to FIGS. 3A-3C, a user of the UE 302 may be hiking in a remote location beyond terrestrial RAN coverage and the user may desire to check in with friends/family. In response to periodic query of the locally-stored dataset, the UE 302 may determine that the UE 302 will enter the first satellite coverage area 306 in less than five minutes; in response to a notification threshold of five minutes, the UE 302 may generate and deliver/display a first push notification to the graphic user interface of the UE 302 in combination with an audible tone. The push notification may comprise an indication of how much time exists until the UE 302 is predicted to be within the first satellite coverage area 306, a prediction of how long the UE 302 will be in the first satellite coverage area 306, a time that the UE 302 will next be in a satellite coverage area such as the second satellite coverage area 312, a prediction of how long the UE 302 will be in the second satellite coverage area 312, and orientation information that suggests an unobstructed view of the sky at a particular azimuth and elevation. If a user of the UE 302 doesn't have an unobstructed view of the sky of the first satellite 304, or if the user desires to utilize the second satellite coverage area 312 (whether because the window is much larger than the first satellite coverage area 304 or any other preference), the user can plan their connection to the second satellite 310; otherwise, the user may utilize the predictive information to find an unobstructed view of the sky prior to the UE 302 entering the first satellite coverage area 306. Once the UE 302 enters the first satellite coverage area, a second push notification may be generated and delivered/displayed on the graphic user interface of the UE 302 in response to a determination that the UE 302 has successfully observed (or selected/camped on to) the first satellite 304—providing the user with situational awareness that they may attempt to call their friends/family and how long until the call may fail due to exiting the first satellite coverage area 306. A third push notification may be generated and delivered/displayed on the graphic user interface of the UE 302 as (or after) the UE 302 exits the first satellite coverage area 306, wherein the third push notification indicates the UE 302 has exited the first satellite coverage area 306 and timing/orientation information for utilizing the subsequent second satellite coverage area 312.

Figure 6:
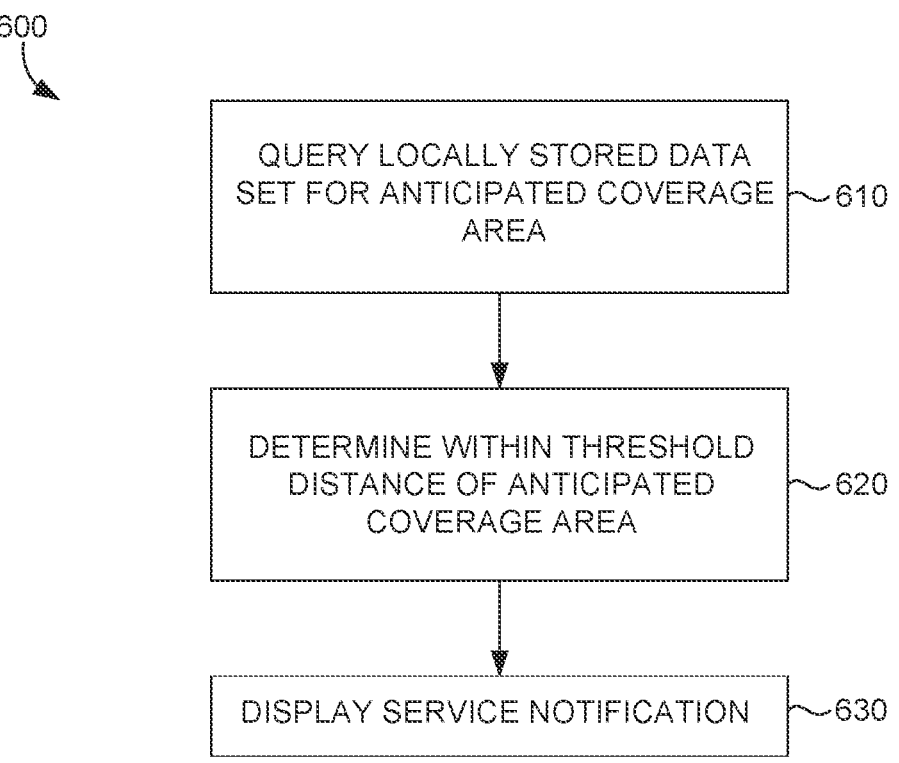
FIG. 6 depicts a flow diagram of an exemplary method for providing a UE with a satellite coverage notification, in accordance with embodiments described herein.

Turning now to FIG. 6, a flow chart representing a method 600 is provided. At a first step 610, a UE queries a locally stored dataset to determine an anticipated coverage area of one or more satellites, according to any one or more aspects described with respect to FIGS. 2-5. At a second step 620, the UE determines that its proximity to one or more satellite coverage areas, according to any one or more aspects described with respect to FIGS. 2-5. At a third step 630 one or more anticipated satellite coverage notifications or indications are displayed on a graphic user interface of the UE, according to any one or more aspects described with respect to FIGS. 2-5.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A user equipment (UE) configured to provide an anticipated satellite coverage notification, the UE comprising:
   a graphic user interface;
   one or more antennas configured to wirelessly communicate with a satellite radio access network; and
   one or more processors configured to perform operations comprising:
   determining a location of the UE;
   querying a dataset stored locally on the UE comprising an anticipated coverage area associated with a first satellite;

determining the location of the UE is outside of but within a predetermined threshold distance of the anticipated coverage area associated with the first satellite prior to the UE entering the anticipated coverage area;
   determining a first amount of time until the anticipated coverage area associated with the first satellite includes the location of the UE, wherein a satellite coverage indication comprising the first amount of time;
   determining a second amount of time that the UE remains inside the anticipated coverage area associated with the first satellite, wherein the satellite coverage indication further comprising the second amount of time; and
   displaying, on the graphic user interface, the satellite coverage indication, wherein the satellite coverage indication comprising the first amount of time and the second amount of time.

2. The UE of claim 1, wherein the satellite coverage indication comprises a push notification.

3. The UE of claim 2, wherein the UE further comprise a speaker, and wherein the satellite coverage indication comprises an audible tone output by the speaker.

4. The UE of claim 1, wherein the satellite coverage indication comprises orientation information.

5. The UE of claim 1, wherein the one or more processors are further configured to:
   query the dataset stored locally on the UE comprising an anticipated coverage area associated with a second satellite;
   determine a third amount of time until the UE enters the anticipated coverage area associated with the second satellite; and
   determine a fourth amount of time that the UE remains inside the anticipated coverage area associated with the second satellite, wherein the satellite coverage indication further comprising the third amount of time and the fourth amount of time.

6. The UE of claim 5, wherein the one or more processors are further configured to determine that the UE has entered the anticipated coverage area associated with the first satellite and to display, based on said determination that the UE has entered the anticipated coverage area associated with the first satellite, a second push notification indicating that the UE has entered the anticipated coverage area associated with the first satellite.

7. The UE of claim 6, wherein the determination that the UE has entered the anticipated coverage area associated with the first satellite is based on a determination that the UE has received a set of synchronization signals from the first satellite, the set of synchronization signals having one or more key performance indicators (KPIs) greater than a predetermined threshold.

8. The UE of claim 7, wherein the one or more processors are further configured to deliver a third push notification to the graphic user interface based on a determination that the one or more KPIs of the synchronization signals is below the predetermined threshold, the third push notification comprising an indication that the UE has exited the anticipated coverage area associated with the first satellite.

9. A method for providing anticipated satellite coverage information comprising:
   determining a location of a user equipment (UE);
   querying a dataset stored locally on the UE comprising a first anticipated coverage area associated with a first satellite and a second anticipated coverage area associated with a second satellite;

determining the location of the UE is outside of but within a predetermined threshold distance of the first anticipated coverage area prior to the UE entering the first anticipated coverage area;

determining a first amount of time until the first anticipated coverage area associated with the first satellite includes the location of the UE, wherein a satellite coverage indication comprising the first amount of time;

determining a second amount of time that the UE remains inside the first anticipated coverage area associated with the first satellite, wherein the satellite coverage indication further comprising the second amount of time; and displaying the satellite coverage indication on a graphic user interface of the UE, wherein the satellite coverage indication comprising the first amount of time and the second amount of time.

10. The method of claim 9, wherein the satellite coverage indication comprises orientation information for the UE to connect to the first satellite.

11. The method of claim 10, further comprising:

determining one or more key performance indicators of a set of synchronization signals received from the first satellite have exceeded a predetermined threshold; and wherein displaying the satellite coverage indication further comprising an indication that the UE has entered the first anticipated coverage area.

12. The method of claim 11, further comprising:

determining the one or more key performance indicators of the set of synchronization signals are less than the predetermined threshold;

determining a third amount of time until the UE is within the second anticipated satellite coverage area; and displaying the satellite coverage indication further comprising the third amount of time.

13. The method of claim 12, wherein the satellite coverage indication further comprising a fourth amount of time that the UE remains located within the second anticipated coverage area.

14. The method of claim 10, wherein the orientation information comprises an instruction to maintain an unobstructed view of the sky along a bearing to the first satellite having an elevation and azimuth.

15. The method of claim 10, wherein the orientation information comprises an instruction to hold the UE in a first position, the first position matching a polarization of the first satellite.

16. The method of claim 9, wherein the method is performed at a predetermined time interval based on a determination that the UE has been without wireless telecommunication from a terrestrial radio access network for greater than a predetermined amount of time.

17. The method of claim 9, wherein the method is performed in response to an input received by the graphic user interface of the UE.

18. A non-transitory computer readable media having instructions stored thereon that, when executed by one or more processors, cause the one or more processors to perform a method for delivering anticipated satellite coverage indications, the method comprising:

querying a locally stored dataset comprising an anticipated coverage area of a satellite;

determining a location of a user equipment (UE);

determining the location of the UE is outside of but within a predetermined threshold distance of the anticipated coverage area prior to the UE entering the anticipated coverage area;

determining a first amount of time until the anticipated coverage area associated with the satellite includes the location of the UE, wherein a satellite coverage indication comprising the first amount of time;

determining a second amount of time that the UE remains inside the anticipated coverage area associated with the satellite, wherein the satellite coverage indication further comprising the second amount of time; and displaying, on a graphic user interface of the UE, the satellite coverage indication, wherein the satellite coverage indication comprising the first amount of time, the second amount of time, and UE orientation information indicating an elevation and an azimuth for maintaining an unobstructed view to the satellite.

* * * * *